(12) United States Patent
Das et al.

(10) Patent No.: US 12,260,651 B2
(45) Date of Patent: *Mar. 25, 2025

(54) MACHINE-LEARNED ARCHITECTURE FOR EFFICIENT OBJECT ATTRIBUTE AND/OR INTENTION CLASSIFICATION

(71) Applicant: Zoox, Inc., Foster City, CA (US)

(72) Inventors: Subhasis Das, San Mateo, CA (US); Oytun Ulutan, Buena Park, CA (US); Yi-Ting Lin, Foster City, CA (US); Derek Xiang Ma, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/621,922

(22) Filed: Mar. 29, 2024

(65) Prior Publication Data

US 2024/0320985 A1 Sep. 26, 2024

Related U.S. Application Data

(63) Continuation of application No. 17/522,832, filed on Nov. 9, 2021, now Pat. No. 11,972,614.

(51) Int. Cl.
*G06V 20/58* (2022.01)
*G05D 1/00* (2024.01)
(Continued)

(52) U.S. Cl.
CPC ........... *G06V 20/58* (2022.01); *G05D 1/0221* (2013.01); *G05D 1/0246* (2013.01); *G05D 1/249* (2024.01);
(Continued)

(58) Field of Classification Search
CPC ........ G06V 20/58; G06V 40/23; G06V 40/20; G06V 10/62; G06V 10/764; G06V 10/82;
(Continued)

(56) References Cited

U.S. PATENT DOCUMENTS 11,087,494 B1 * 8/2021 Srinivasan .............. G01S 17/89
11,449,065 B2 * 9/2022 Dariush ............... G05D 1/0221
(Continued)

FOREIGN PATENT DOCUMENTS

CA 2739989 A1 * 4/2010 ........... G01S 17/023
CA 2739989 C 12/2016
(Continued)

OTHER PUBLICATIONS

The PCT Search Report and Written Opinion mailed Mar. 14, 2023 for PCT application No. PCT/US2022/049434, 12 pages.; Application Number.

*Primary Examiner* — Mahendra R Patel
(74) *Attorney, Agent, or Firm* — Lee & Hayes, P.C.

(57) ABSTRACT

A system for faster object attribute and/or intent classification may include an machine-learned (ML) architecture that processes temporal sensor data (e.g., multiple instances of sensor data received at different times) and includes a cache in an intermediate layer of the ML architecture. The ML architecture may be capable of classifying an object's intent to enter a roadway, idling near a roadway, or active crossing of a roadway. The ML architecture may additionally or alternatively classify indicator states, such as indications to turn, stop, or the like. Other attributes and/or intentions are discussed herein.

20 Claims, 5 Drawing Sheets

(51) Int. Cl.
*G05D 1/249* (2024.01)
*G06N 3/04* (2023.01)
*G06N 3/08* (2023.01)
*G06V 40/20* (2022.01)

(52) U.S. Cl.
CPC .............. *G06N 3/04* (2013.01); *G06N 3/08* (2013.01); *G06V 40/23* (2022.01)

(58) Field of Classification Search
CPC .... G06V 20/56; G06V 40/103; G05D 1/0221; G05D 1/0246; G05D 1/249; G06N 3/04; G06N 3/08; G06N 3/084; G06N 3/044; G06N 3/045
USPC ........................................................ 382/104
See application file for complete search history.

(56) References Cited

U.S. PATENT DOCUMENTS

| | | | | |
|---|---|---|---|---|
| 11,460,857 | B1* | 10/2022 | Tan | G06N 3/084 |
| 11,521,396 | B1* | 12/2022 | Jain | G06F 18/2415 |
| 11,537,139 | B2* | 12/2022 | Rankawat | G05D 1/0088 |
| 11,682,272 | B2* | 6/2023 | Avadhanam | G06N 3/045 |
| | | | | 340/944 |
| 11,700,356 | B2* | 7/2023 | Raichelgauz | H04W 4/48 |
| | | | | 701/23 |
| 11,703,566 | B2* | 7/2023 | Cohen | G06T 7/11 |
| | | | | 382/159 |
| 11,710,352 | B1* | 7/2023 | Ulutan | G06V 40/23 |
| | | | | 382/103 |
| 11,731,662 | B2* | 8/2023 | Wyffels | B60W 30/09 |
| | | | | 701/36 |
| 11,748,620 | B2* | 9/2023 | Elluswamy | G16Y 20/10 |
| | | | | 382/159 |
| 11,829,449 | B2* | 11/2023 | Parikh | G06V 10/82 |
| 11,851,081 | B2* | 12/2023 | Refaat | B60W 60/001 |
| 11,885,886 | B2* | 1/2024 | Alghanem | G01S 17/931 |
| 12,012,127 | B2* | 6/2024 | Das | G06T 7/215 |
| 12,065,140 | B1* | 8/2024 | Pronovost | B60W 40/04 |
| 2018/0336692 | A1* | 11/2018 | Wendel | G06V 20/584 |
| 2019/0147372 | A1* | 5/2019 | Luo | G06N 20/00 |
| | | | | 706/20 |
| 2019/0333232 | A1* | 10/2019 | Vallespi-Gonzalez | |
| | | | | G06N 5/01 |
| 2019/0354782 | A1* | 11/2019 | Kee | G06F 18/217 |
| 2020/0051252 | A1* | 2/2020 | Brown | G05D 1/0088 |
| 2021/0049378 | A1* | 2/2021 | Gautam | G06T 7/20 |
| 2021/0049776 | A1 | 2/2021 | Tan et al. | |
| 2021/0053570 | A1* | 2/2021 | Akella | G05D 1/0088 |
| 2021/0084451 | A1 | 3/2021 | Williams | |
| 2021/0103742 | A1* | 4/2021 | Adeli-Mosabbeb | G06V 40/10 |
| 2021/0157312 | A1* | 5/2021 | Cella | G01M 13/045 |
| 2021/0181837 | A1* | 6/2021 | Jiang | G06F 3/011 |
| 2021/0192748 | A1* | 6/2021 | Morales Morales | G06V 10/82 |
| 2021/0347377 | A1* | 11/2021 | Siebert | G06N 5/04 |
| 2022/0111873 | A1* | 4/2022 | Wyffels | G06V 40/10 |
| 2023/0144745 | A1 | 5/2023 | Ulutan | |

FOREIGN PATENT DOCUMENTS

| | | | | |
|---|---|---|---|---|
| CA | 2999498 C | | 5/2020 | |
| CA | 3128028 A1 | * | 8/2020 | .......... G05D 1/0214 |
| JP | 2006065513 A | | 3/2006 | |
| JP | 2020204804 A | | 12/2020 | |
| KR | 20190115542 A | | 10/2019 | |
| KR | 20210084451 A | | 7/2021 | |
| WO | WO-2018158642 A1 | * | 9/2018 | ........ B60W 30/0956 |
| WO | WO-2018218155 A1 | * | 11/2018 | ............ G01C 21/32 |
| WO | 2020198121 A1 | | 10/2020 | |
| WO | 2021046103 A1 | | 3/2021 | |
| WO | WO-2021118697 A1 | * | 6/2021 | .......... G05D 1/0088 |
| WO | WO-2021137849 A1 | * | 7/2021 | ......... G06F 9/44505 |

\* cited by examiner

MACHINE-LEARNED ARCHITECTURE FOR EFFICIENT OBJECT ATTRIBUTE AND/OR INTENTION CLASSIFICATION

RELATED MATTER

This application claims priority to and is a continuation of U.S. patent application Ser. No. 17/522,832, filed Nov. 9, 2021, the entirety of which is incorporated by reference herein for all purposes.

BACKGROUND

Computer vision is used in numerous applications, such as operating autonomous vehicles, identifying individuals for security purposes, etc. Computer vision techniques may include building software components that identify salient portions from an image, representing the salient portions of the image to the computer in a form that the computer can use to conduct further operations, such as object detection, classification, and/or tracking. However, conventional computer vision techniques, taken by themselves, aren't capable of the near-human-level of perception needed to successfully operate complex systems such as autonomous vehicles.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

As discussed above, conventional computer vision systems are incapable of detecting enough information, by themselves, to operate complex systems, such as driving an autonomous vehicle. The techniques discussed herein may increase the detection effectiveness and capabilities of a computer vision system. The techniques may additionally or alternatively increase the efficiency of the computer vision system by decreasing the computational load for operating the computer vision system. The techniques discussed herein may include a machine-learned (ML) architecture that receives multiple images although, in additional or alternate examples, other forms of sensor data (e.g., time of flight, radar, lidar) are contemplated. The multiple images (or other sensor data) may be associated with a same object over multiple times. A first ML component may detect an object in an image and may associate the detection with image(s) captured at previous time step(s). The portion(s) of these different images may be provided as input to the instant ML architecture.

The ML architecture discussed herein may use a temporal range of inputs to produce an output. In other words, the ML architecture may use sensor data received over a range of time or number of discrete sensor outputs to determine an output. For example, the ML architecture may receive an image (or portion thereof associated with an object) and may determine a set of features by processing the image using a first set of ML layers. The first set of ML layers may produce a first output that may be stored in a memory (e.g., cache). At a next stage in the ML architecture, the ML architecture may retrieve a second output associated with a second image from the memory the first and the second image may be associated with a same object but the second image may have been captured at a time prior to a time at which the first image was captured. The first output and second output may be processed separately by a second ML layer, creating third and fourth outputs respectfully. The third and fourth outputs may be concatenated and provided as input to a third ML layer, creating a set of reduced features. The set of reduced features may be provided as input to a third ML layer, which may output logit(s), which may be used to determine confidence score(s) associated with a classification task. For example, a logit, the values of which may go to infinity, may be transformed by a sigmoid layer to a confidence score, which may be bounded between 0 and 1, inclusive. For outputs that are mutually exclusive, such as an object state such as running, walking, standing, crouching, etc. or an object attribute such as idling, intent to enter roadway, crossing roadway, etc., a softmax may be used in addition to or instead of a sigmoid layer. The sigmoid layer may additionally or alternatively be a hyperbolic tangent layer, rectified linear unit (ReLU) layer, Gaussian error linear unit (GELU) layer, or the like.

In some examples, the ML architecture discussed herein may be used to classify attribute(s) and/or gesture(s) associated with an object. For example, the confidence score(s) discussed herein may indicate a likelihood that an object such as a pedestrian is idling next to a roadway (e.g., standing or otherwise being preoccupied without actively looking to cross a roadway), standing or otherwise positioned to move (e.g., hands on wheelchair wheels, feet on bicycle pedals), seated or otherwise positioned to remain in place, looking at an autonomous vehicle, intending to enter a roadway, actively crossing a roadway, not related to a roadway, indicating that the autonomous vehicle should go (e.g., waving the vehicle on, nodding), etc. The ML architecture may be used to additionally or alternatively classify a light state, such as a traffic light state, vehicle indicator state, or the like. For example, ML architecture may classify vehicle indicator light(s) as indicating that the vehicle is stopping, parked, reversing, attempting a left turn, attempting a right turn, or the like; and/or the ML architecture may classify a traffic light as indicating permission to proceed, proceed with caution, unprotected turn, an instruction to stop, or the like. The output from the ML architecture discussed herein may output a confidence score associated with one or more of these attributes and may output a confidence score in association with each attribute, in some examples.

The ML architecture discussed herein may reduce the computational load for detecting various object attributes from multiple instances of sensor data received over a time period. The ML architecture may also increase detection capabilities of a vision system and may thereby enable an autonomous vehicle to interpret its surroundings with a greater degree of accuracy, reducing delay and/or requests for assistance generated by the vehicle and increasing the scenarios that the autonomous vehicle can navigate safely and efficiently.

Example Scenario

Figure 1:
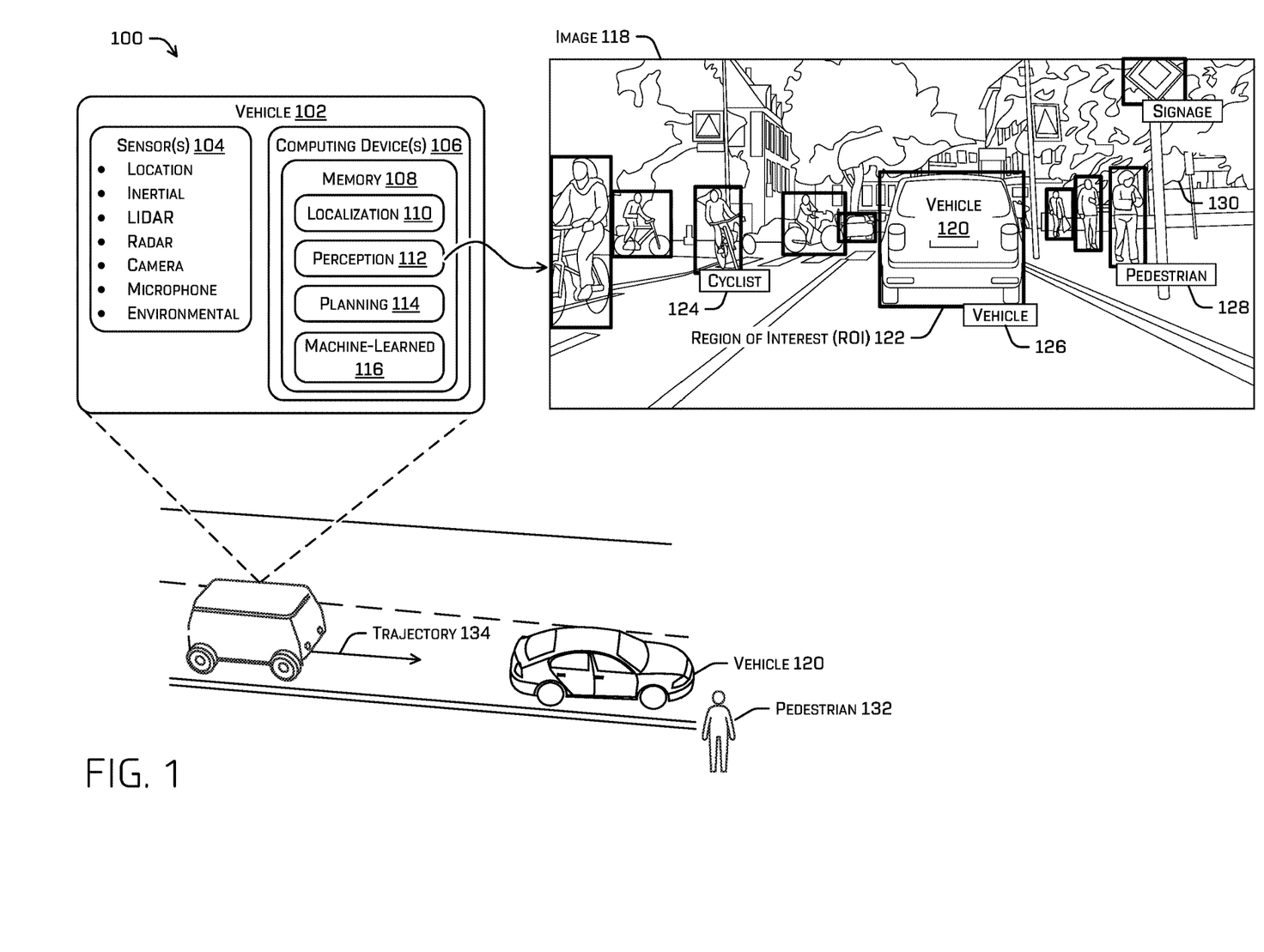
FIG. 1 illustrates an example scenario depicting an autonomous vehicle detecting multiple objects in an environment represented in sensor data.

FIG. 1 illustrates an example scenario 100 including a vehicle 102. In some examples, the example scenario 100 may be a real-world scenario and/or the example scenario 100 may be a representation of a real-world scenario modeled as a simulated scenario. In examples where the example scenario 100 is a simulated scenario, the example scenario 100 may be determined based at least in part on input received at a user interface of a computing device (e.g., a user of the computing device may define the environment, objects therein, and/or characteristics thereof) and/or the example scenario 100 may be based at least in part on log data received from one or more autonomous vehicles (i.e., data captured and stored during actual driving in a physical environment including raw sensor data and data derived therefrom including detections, predictions, control signals, etc.). The log data may be based at least in part on sensor data received at an autonomous vehicle, perception data generated by a perception component, and/or instructions generated by a planning component. In some examples, the autonomous vehicle may store the log data and/or periodically transmit the log data to a remote computing device.

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein and an example where scenario 100 is a real-world example, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 104 on the vehicle 102 and in a simulation, one or more of sensor(s) 104 may be simulated. In some examples, the position of a simulated sensor may correspond with a relative position of one of the sensor(s) 104 to the vehicle 102.

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a localization component 110, a perception component 112, a planning component 114, and/or a machine-learned (ML) component 116. In some examples, the ML component 116 may be part of the perception component 112 and the ML component 116 may include the ML architecture discussed herein. In general, localization component 110 may comprise software and/or hardware system(s) for determining a pose (e.g., position and/or orientation) of the vehicle 102 relative to one or more coordinate frames (e.g., relative to the environment, relative to a roadway, relative to an inertial direction of movement associated with the autonomous vehicle). The localization component 110 may output at least part of this data to the perception component 112, which may output at least some of the localization data and/or use the localization data as a reference for determining at least some of the perception data.

The perception component 112 may determine what is in the environment surrounding the vehicle 102 and may include a prediction component that predicts a state of detected object(s) and/or of the environment. The ML component 116 may be at least part of how the perception component 112 determines what is in the environment, particularly for detecting an attribute of an object from sensor data determined over time. The planning component 114 may determine how to operate the vehicle 102 according to information received from the localization component 110 and/or the perception component 112. The localization component 110, the perception component 112, the planning component 114, and/or the ML component 116 may include one or more machine-learned (ML) models and/or other computer-executable instructions.

In some examples, the localization component 110, the perception component 112, and/or the ML component 116 may receive sensor data from the sensor(s) 104. In some instances, the perception component 112 may determine data related to objects in the vicinity of the vehicle 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. In some examples, the objects surrounding the vehicle 102 may be simulated objects of a simulated environment. The data produced by the perception component 112 may be collectively referred to as "perception data." Once the perception component 112 has generated perception data, the perception component 112 may provide the perception data to the planning component 114.

In some examples, prediction data determined by the perception component 112 may be additionally or alternatively based at least in part on map data or other data. In some examples, the prediction data may comprise a top-down segmentation of the environment, as described in more detail in U.S. patent application Ser. No. 15/963,833, which is incorporated by reference in its entirety herein for all purposes, and/or a top-down prediction associated with the environment, as described in more detail in U.S. patent application Ser. No. 16/779,576, which is incorporated by reference in its entirety herein for all purposes. The map data map be stored by memory 108. In some examples, the prediction data and/or other perception data may be stored as part of log data.

For example, the perception component 112 and/or ML component 116 may receive image 118 (and/or other sensor data), which includes a representation of a vehicle 120, multiple cyclists, multiple pedestrians, multiple signage objects, and a variety of different environmental objects (e.g., roadway, sidewalk, trees, buildings). The perception component 112 may determine a region of interest (ROI) 122 based at least in part on detecting vehicle 120 as being represented in image 118. In the illustrated example, the ROI 122 is a bounding box, although other techniques for identifying the ROI are contemplated, such as an instance segmentation, semantic segmentation, mask, and/or a bounding shape other than a rectangle. FIG. 1 additionally depicts multiple other ROIs that may be generated by the perception component 112 for different objects that may be detected by the perception component 112, but, for simplicity and clarity, they are not all labeled. For example, the other ROIs identify cyclists, another vehicle, and traffic signage, although it is understood that additional or alternative portions of an image (and/or other sensor data) may be detected by the perception component 112.

In some examples, the perception component 112 may additionally or alternatively determine, by a first ML model, a classification of an object. For example, the first ML model may be trained to output an indication of a classification, from among a plurality of classifications, that corresponds with a highest probability determined by the ML model. The general classifications may include classifications such as, for example, "cyclist," "vehicle," "pedestrian," "animal," "environmental object," etc. In the depicted example, these classifications include classification 124, "cyclist"; classification 126, "vehicle"; classification 128, "pedestrian"; and classification 130, "signage". Although, for the sake of clarity, only a sampling of general classifications are depicted in FIG. 1, it is understood that the first ML model of the perception component 112 may determine a classification for one or more of the ROIs and/or objects detected from the sensor data.

Additionally or alternatively the perception component 112 may determine a track that may indicate a historical, current, and/or predicted position, orientation, velocity, acceleration, state, and/or the like associated with an object. The perception component 112 may additionally or alternatively determine portion(s) of sensor data associated with the track. For example, the track my identify a portion of different instances of sensor data that are associated with a same object. To further illustrate, the track may identify ROIs from different images associated with different times that are all associated with a same object. In other words, the track identifies different object detections in time as being associated with a same object.

In some examples, perception component 112 may provide sensor data that has been associated with a track to the ML component 116. For example, the perception component 112 may provide the last n number of images associated with an object (as identified by a track) to the ML component 116, where n is a positive integer. In some examples, an image provided to the ML component 116 may be the portion of the image identified by an ROI. For example, the portion of image 118 identified by ROI 122 may be provided to ML component 116 as input. In some examples, the perception component 112 may provide such image portions to the ML component 116 as input as they are determined by a respective ML model of the perception component 112 and/or in batches of n images. See U.S. patent application Ser. No. 16/235,862, filed Dec. 28, 2018; and U.S. patent application Ser. No. 16/297,381, filed Mar. 2, 2019; for additional detail regarding ML model(s) for determining object tracks and determining ROIs, instance segmentations, and/or semantic segmentations associated with a detected object.

As discussed further herein, the ML component 116 may include a cache for storing portions of sub-outputs of the ML component 116 that are interior to the ML component 116's processing. The cache may be part of memory 108 or the cache may be part of distinct hardware associated with the ML component 116, such as a portion of an integrated circuit, gate array, or graphics processing unit. The ML component 116 may output attribute(s) that have additional granularity in comparison to the classifications output by other portions of the perception component 112. For example, these attributes may include whether a pedestrian or driver is paying attention to or looking at the vehicle 102, whether an object (e.g., pedestrian 132, animal) intends to cross a roadway, whether an object is idling next to a roadway (e.g., not exhibiting a current intent to enter the roadway but manifesting some relation to the roadway that may result in entering the roadway or otherwise affecting traffic), whether an object is entering or actively crossing a roadway, whether an object is not related to a roadway (e.g., exhibiting no intent to interact with a roadway, such as by walking along a sidewalk, playing in a field on the other side of a sidewalk from the roadway), whether an object is indicating that the vehicle 102 should proceed, etc.

The planning component 114 may determine trajectory 134 based at least in part on the perception data and/or other information such as, for example, attribute(s) determined by ML component 116. For example, the planning component 114 may determine a route for the vehicle 102 from a first location to a second location; generate, substantially simultaneously and based at least in part on the perception data and/or the simulated perception data, a plurality of potential trajectories for controlling motion of the vehicle 102 in accordance with a receding horizon technique (e.g., 1 microsecond, half a second) to control the vehicle to traverse the route (e.g., in order to avoid any of the detected objects); and select one of the potential trajectories as a trajectory 134 that the vehicle 102 may use to generate a drive control signal that may be transmitted to drive components of the vehicle 102.

FIG. 1 depicts an example of such a trajectory 134, represented as an arrow indicating a heading, velocity, and/or acceleration, although the trajectory itself may comprise a command and/or target (future) state of the vehicle 102, which may, in turn, actuate a drive system of the vehicle 102. For example, the trajectory 134 may comprise instructions for controller(s) of the autonomous vehicle 102 to actuate drive components of the vehicle 102 to effectuate a steering angle and/or steering rate, which may result in a vehicle position, vehicle velocity, and/or vehicle acceleration (or a simulated version thereof when the autonomous vehicle is being simulated) to track the command and/or target state. The trajectory 134 may comprise a target heading, target steering angle, target steering rate, target position, target velocity, and/or target acceleration for the controller(s) to track.

Example System

Figure 2:
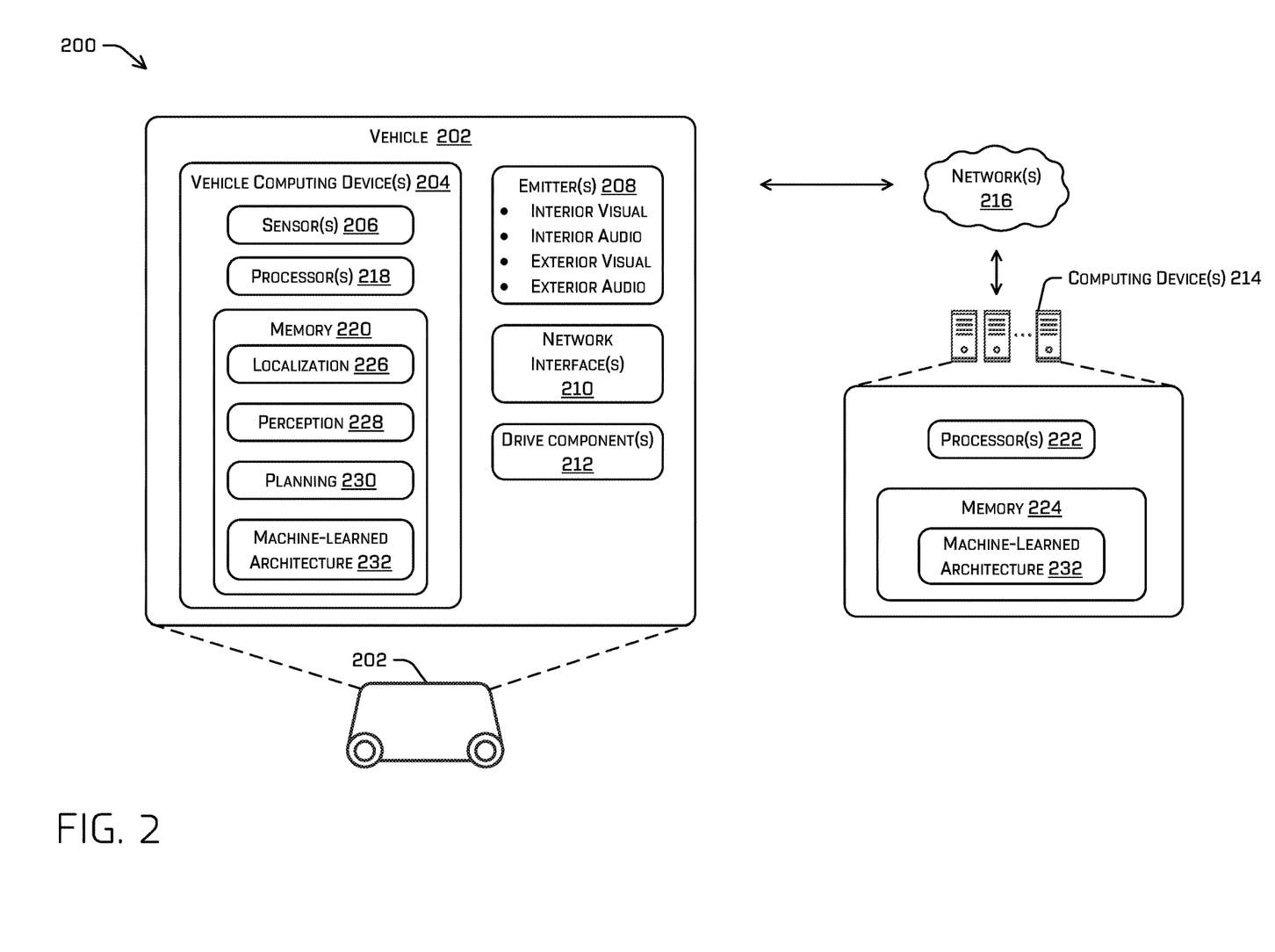
FIG. 2 illustrates a diagram of an example architecture for detecting object attributes and/or intentions.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. By way of example and not limitation, vehicle computing device(s) 204 may represent or be of the same type(s) as computing device(s) 106 and sensor(s) 206 may represent or be of the same type(s) as sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. In some examples, the simulated sensors discussed herein may correspond to a specific type of sensor and/or any of the sensors. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, and/or ML architecture 232,—zero or more portions of any of which may be hardware, such as GPU(s), CPU(s), and/or other processing units. By way of example and not limitation, localization component 226 may represent or be of the same type(s) as localization component 110, perception component 228 may represent or be of the same type(s) as perception component 112, planning component 230 may represent or be of the same type(s) as planning component 114, and ML architecture 232 may represent or be of the same type(s) as ML component 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization, and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 228 may include a prediction component that predicts actions/states of dynamic components of the environment, such as moving objects. Data determined by the perception component 228 is referred to as perception data.

In some examples, the perception component 228 may include the ML architecture 232. For example, the ML architecture 232 may be part of a pipeline of perception component 228. In other words, the ML architecture 232 may receive, as input, output(s) from one or more other portions of the perception component 228, such as sensor data pre-processing components, ML model(s), and/or the like. For example, the input to the ML architecture 232 may comprise portion(s) of sensor data identified by other portions of the perception component 228 as being associated with an object. A portion may be identified by an instance segmentation, semantic segmentation, ROI, and/or the like. In some examples, the ML architecture 232 may be configured to receive sensor data over multiple points in time.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 230 may comprise hardware/software-in-a-loop in a simulation (e.g., for testing and/or training the planning component 230), the planning component 230 may generate instructions which may be used to control a simulated vehicle.

The memory 220 and/or 224 may additionally or alternatively store a mapping system, a planning system, a ride management system, etc. Although perception component 228, planning component 230, and/or performance component 234 are illustrated as being stored in memory 220 and/or 224, perception component 228, planning component 230, and/or performance component 234 may include processor-executable instructions, machine-learned model(s) (e.g., a neural network), and/or hardware.

As described herein, the localization component 226, the perception component 228, the planning component 230, and/or ML architecture 232 may comprise one or more ML models. For example, the localization component 226, the perception component 228, the planning component 230, and/or the ML architecture 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated by reference in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 230 may generate instructions based at least in part on perception data generated by the perception component 228 and/or simulated perception data and transmit the instructions to the system controller(s), which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example ML Component Architecture

Figure 3:
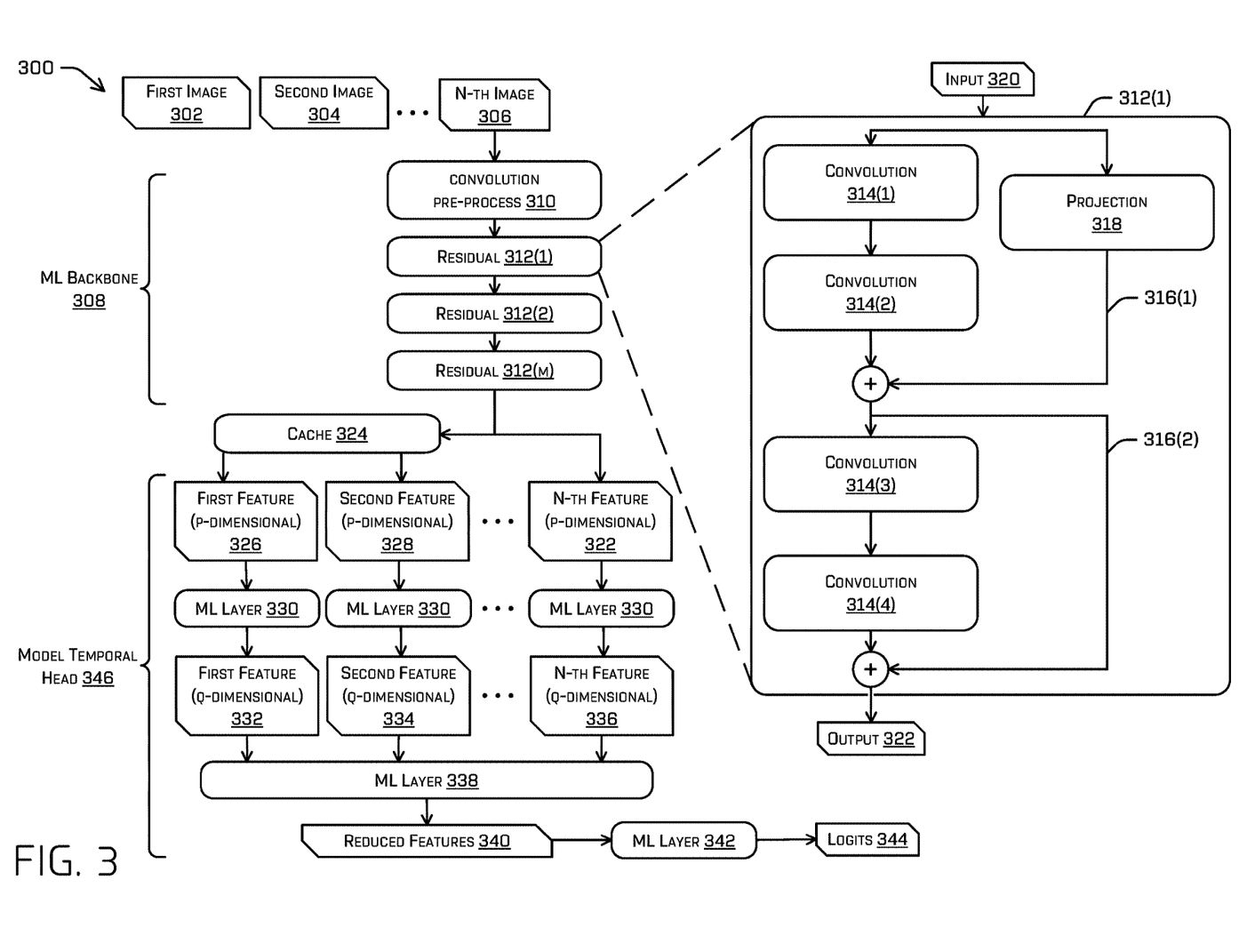
FIG. 3 illustrates a diagram of an example machine-learned component architecture for detecting object attributes and/or intentions and reducing the computational bandwidth for doing so.

FIG. 3 illustrates an example architecture 300 of the ML component 116/ML architecture 232. This arrangement of ML layers and cache may result in the efficiencies highlighted herein and may increase the attributes detectable by the perception component of an autonomous vehicle. The example architecture discussed herein may be appropriated to additional or alternate sensor data types beyond images, although images are discussed because of their ease of understanding. In some examples, the images discussed herein may be received from a single camera or from multiple cameras. In some examples, whatever sensor data is received, e.g., image data or point cloud data, may be received from upstream component(s) in the perception component 228. For example, the example architecture 300 may receive first image 302, second image 304, and n-th image 306 may include portions of respective images identified by an upstream component (e.g., via an ROI, instance segmentation, and/or semantic segmentation output by the upstream component) and may be related via a track output by another upstream component. The track may identify the first image 302, second image 304, and n-th image 306 as being associated with a same object. In other words, the techniques discussed herein may use a batch of n images to determine the ultimate output, which may be a classification, as discussed herein. The n images may correspond with a sliding time window of the most recent n images received from a camera.

In some examples, the example architecture 300 may be configured to handle n time steps of sensor data, where n is a positive integer. In other words, the first image 302 through the n-th image may be associated with different points in time back to n time steps in the past. The time period between each image may depend on the sensor output and upstream perception component output frequency. For example, if the interval is 500 milliseconds and n is 9, the first image 302 may be associated with a time 4 seconds in the past, the second image 304 may be associated with a time 3.5 seconds in the past, and the n-th image may be associated with a current time. Other intervals and choices of n are contemplated, e.g., 10 milliseconds, 20 milliseconds, 100 milliseconds, 250 milliseconds, 1 second, 2 seconds, etc., and n may be 2, 3, 4, 5, 10, 20, or any other number. In some examples, the time period between sensor data received may not be constant and may vary within a tolerance. For example, the system may tolerate variance between when sensor data is received, losing track of an object for a few frames (e.g., due to an occlusion), loss or corruption of a few frames, distortion of the sensor data (e.g., due to rain, glare), and/or the like. Note that n may change proportionally to the time period between time steps so that the output of the architecture 300 is current. For example, n may decrease as the interval increases in length.

In some examples, the ML architecture 300 may resize the n-th image 306 to a standardized size before processing the image. Additionally or alternatively, the ML architecture 300 may obtain a larger portion of an image than is indicated by an ROI for use as the n-th image 306. For example, an upstream component may detect a pedestrian and indicate a portion of an image occupied by a pedestrian, but the pedestrian may be holding a sign, which may rightly not be detected by the upstream component as being a pedestrian. For this reason, the ML architecture 300 may obtain an additional portion of the image outside the ROI for use by the ML architecture 300.

Regardless, the most-recently received image, n-th image 306 may be provided as input to an ML backbone 308, which may comprise one or more ML layers. For example, the ML backbone 308 may be a ResNet or other suitable neural network, e.g., ResNeXt, DenseNet, vision transformer (ViT). For example, where the ML backbone 308 is a ResNet, the ML backbone may comprise a convolution pre-process layer 310 (e.g., a feedforward neural network layer) and residual layers 312(1)-(m) where m is a positive integer. The ML backbone 308 may be used sequentially on images as they are received. In other words, the same ML backbone 308 is used on any new image that is received and the output thereof may be stored as discussed herein. Using this same ML backbone may save on training time and may reduce the system complexity, while using the output storing in the middle of the pipeline (i.e., cache 324) may reduce the computational load and processing time of the architecture 300.

A residual layer 312(1) may comprise a ResNet block, which may include various components, including convolution layers 314(1)-(4), skip-connection(s) 316(1) and (2), and projection shortcut 318, which may be part of a skip connection. These various portions may process an input 320 received from a previous layer and may generate an output 322 provided to a next layer. Note that the projection shortcut may be replaced by an identity shortcut. The projection shortcut may perform a convolution to ensure the volumes at the addition operation (at the end of the skip connection and at the output of the last convolution layer before the addition) correspond. The identity shortcut merely passes the input it is the standard skip connection. A convolution layer 314 may include a convolution of the input to the convolution component with a trained kernel (e.g., the kernel is a portion that may be tuned via ML training), a batch normalization (e.g., see U.S. patent application Ser. No. 16/403,476, filed May 3, 2019), and, for the intermediate layers, an activation layer, such as a rectified linear unit (ReLU) layer, Gaussian error linear unit (GELU), Heaviside activation, sigmoid or hyperbolic functions (although sigmoid and tan h functions may contribute to diminishing gradients by being saturated by an input (i.e., being unable to express values over a certain amount)). In essence, this activation layer characterizes an output at a particular point in the feature data as being "on", i.e., 1.0, or "off", i.e., 0.0/activated or inactive. Note that the last convolution component 314(4) may conduct a convolution and batch normalization but may not conduct a ReLU activation.

In other words, the input to one of the residual components 312 may be convolved with a first convolutional layer, batch normalized, and put through a ReLU activation before repeating the process a second time with a second convolutional layer. The output of the second layer can be summed with the input to the residual component (or the projected version of the input where a projection layer exists in the skip connection). This process can be repeated a second time with a third and fourth convolutional layer before being output by that particular residual component.

This depicted ML backbone includes approximately 11 million trainable parameters, although it is understood that a deeper ML backbone may be used, i.e., an ML backbone with a greater number of layers, in which case the ML backbone may have 21.2 million parameters that are trainable (34 layers), 23.5 million parameters (50 layers), 42.5 million parameters (101 layers), 58.2 million parameters (152 layers), and so on. The layers may be altered (e.g., values of the kernel(s) of the convolution layers and/or projection layers or other ML layers downstream from the ML backbone) to reduce a loss computed between an logit or confidence score that is output by the ML architecture and a ground truth attribute that identifies an attribute of the object was doing. Such a ground truth attribute may be human labeled or may be labeled by a complex ML system that may be too computationally burdensome to include on the vehicle. Such an ML system may execute on a distributed computing system, such as a cloud computing system.

Ultimately, the ML backbone 308 may determine feature data associated with the n-th image 306, n-th feature data 322, which is p-dimensional, where p is a positive integer (e.g., 32, 64, depending on the number of layers in the CNN and the amount of padding in the layers). The n-th feature data 322 may be stored in a cache 324. Feature data associated with the previously received images (first image 302 and second image 304) may have previously been stored in the cache 324. In other words, the ML backbone 308 may have previously determined first feature data 326 by processing first image 302 through the ML backbone 308 and second feature data 328 by processing the second image 304 through the ML backbone 308. The first image 302 and second image 304 (and any other intermediate images) are not re-processed upon receiving the n-th image 306, which saves computational load. The cache 324 may be part of an integrated circuit that includes the ML architecture 300 although, in additional or alternate examples, the cache 324 may be a cache of a graphics processing unit, central processing unit, gate array, or the like.

In some examples, the feature data may comprise a feature map, also called an activation map, that is a result of the convolution of the kernels in the model backbone with the respective inputs to each layer. The feature data is typically a human-incomprehensible high dimensional data field (e.g., 56 by 64 dimensions, 28 by 128 dimensions, or the like), such as a tensor. In other words, the feature data is a computer and/or neural network transformation.

Based at least in part on receiving the n-th feature data 322, the ML architecture 300 may provide the first feature data 326, second feature data 328, n-th feature data 322, and any intervening feature data associated with any other images between the first and n-th image as input to an ML layer 330. In some examples, a single ML layer 330 is used at this stage for each feature data, although it's contemplated that more ML layers 330 may be used. In other words, the ML layer 330 may process first feature data 326 through the n-th feature data 322 separately to produce first feature data 332, second feature data 334, through the n-th feature data 336, all of which may be q-dimensional, where q is a positive integer greater than p. For example, q may be 128 if p is 32.

Note that, in an example architecture 300 for classifying a light state, such as a traffic light state or a vehicle light state, ML layer 330 may be an identity layer that just passes the input thereto or may not exist.

The feature data output by the ML layer 330 (i.e., first feature data 332 through n-th feature data 336) may be concatenated together and provided as input to ML layer 338, which may be designed to reduce the dimensionality of the concatenated feature data, which may be of the size n q. The ML layer 338 may project the concatenated feature data from an n q dimension into a q-dimensional space, achieving reduced features 340. For example, if q is 128 and n is 5, the concatenated feature data may have a dimensionality of 640 and the reduced features 340 may have a dimensionality of 128.

The reduced features 340 may be provided as input to a final ML layer 342, which may include output heads equal to the number of attributes predicted by the ML architecture. For example, if the ML architecture 300 is configured to predict 10 attributes, ML layer 342 may have 10 output heads, although any other number of attributes is contemplated, e.g., 2, 3, 4, 5, 10, 15, 20, etc. In some examples, an output head of the ML layer 342 may be associated with a particular attribute that is being predicted and may output a logit indicating a probability that the detected object has the attribute associated with the head. The ML layer 342 may output these logits 344 in association with the different attributes and/or the ML layer 342 may include a sigmoid, tan h, ReLU, GELU, or the like layer after the output heads or some other layer to transform the logits 344 into confidence scores between 0 and 1, where 1 indicates perfect confidence that an object has a respective attribute and 0 indicates no confidence that the object has the respective attribute. The confidence score output by the example architecture 300 may be associated with a most recent time, but may be based on a window of time going back n time steps into the past (e.g., logits 344 may be associated with the n-th time step, but may be generated based on images 302-306).

The ML layers 330, 338, and 342 may each be fully connected layers with different input/output shapes. Collectively ML layers 330, 338, and 342 may make up a model temporal head 346.

Example Attributes

Figure 4:
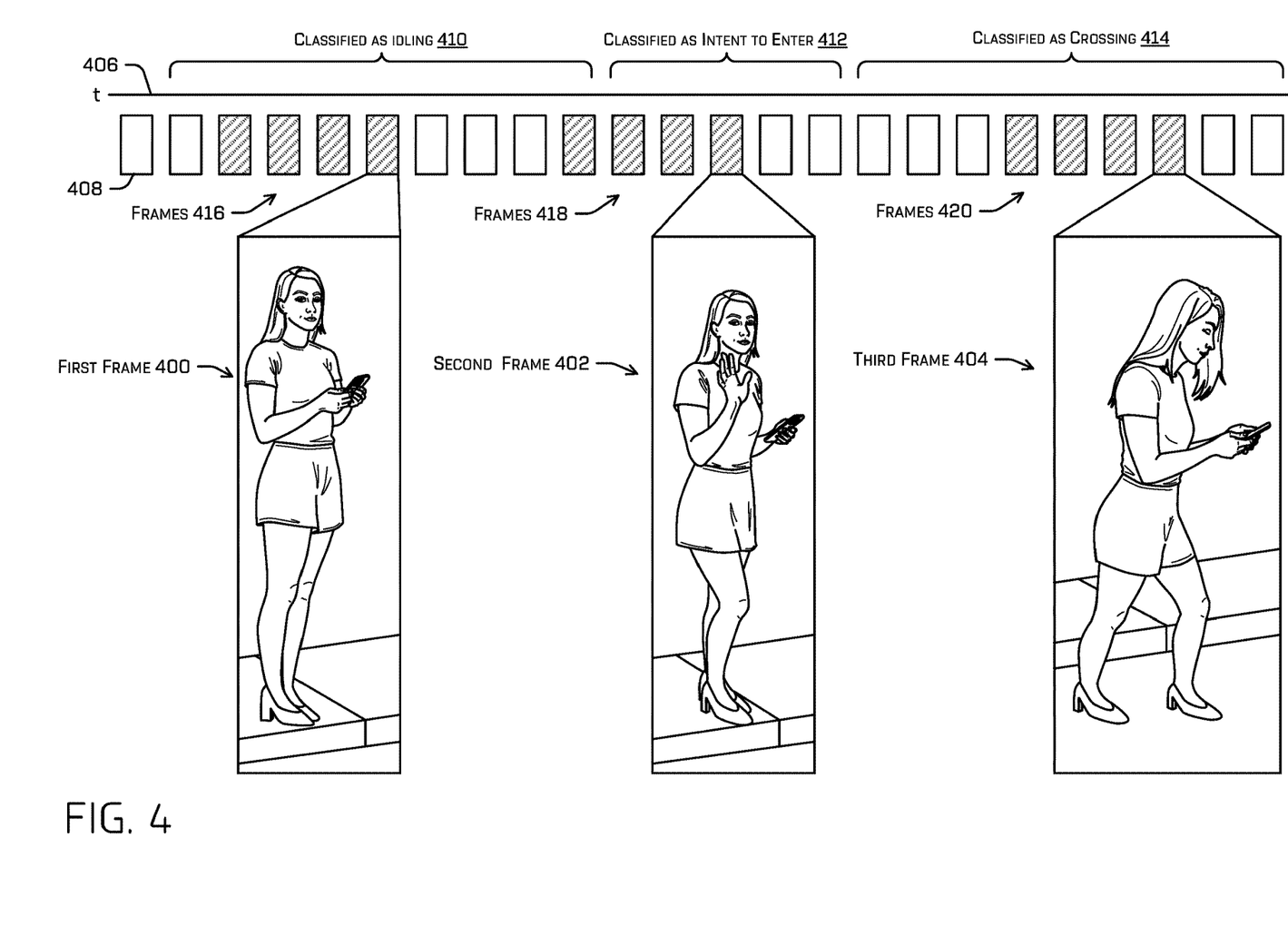
FIG. 4 illustrates example image portions associated with different object attributes detectable by the machine-learned component discussed herein.

FIG. 4 depicts three example frames (discrete portions of sensor data in time) 400-404 and attributes predicted by ML architecture 300 for each of the frames. The depicted frames are images, although it is understood that the frames may be a portion of point cloud data or any other sensor data. FIG. 4 also depicts a timeline 406 and other frames that were received and processed by the ML architecture 300, such as frame 408, which is depicted as a rectangle but is not associated with one of the classifications discussed regarding FIG. 4. FIG. 4 depicts the frames that may have each been classified as having a same attribute. For example, each of the frames under the bracket indicated by 410 may be classified as indicating an object that has the attribute "idling;" the first frame 400 is an example of an frame that may be classified as such. The frames under bracket 412 may be classified as indicating an object that has the attribute "intent to enter roadway;" the second frame 402 is an example of an frame that may be classified as such. The frames under bracket 144 may be classified as indicating an object that has the attribute "crossing roadway;" the third frame 404 is an example of an frame that may be classified as such.

For the first frame 400, the highest confidence score output by the ML architecture 300 may be associated with an idling attribute that indicates that an object is related to the roadway but not exhibiting an intent to enter the roadway. To classify the first frame 400 as such, the ML architecture 300 may receive and process frames 416, indicated using diagonal hatching, as input. In other words, the attribute output by the ML architecture 300 in association with the first frame 400 depends on the ML architecture 300 processing the first frame 400 and the three frames that precede the first frame 400 in time in an example where n is 4. It is contemplated that n may be greater or lesser. As discussed above and below, processing the frame 416 may include processing each of the frames 416 using the ML backbone once per frame, as each frame is received, and storing the output. So, for the first frame 400, processing the frames 416 may comprise processing the first frame 400 using the ML backbone and recalling the previous outputs for the other frames 416 for the remaining portion of the ML architecture.

In an additional or alternate example, the ML architecture 300 may determine an attribute for output if it meets or exceeds a confidence threshold and/or if the confidence score is greater than the other confidence scores associated with different attributes. In some examples, the attributes may be grouped into different groups and the ML architecture 300 may determine to output any confidence score that both meets or exceed a confidence threshold and is greater than all the other confidence thresholds in the same group. For the first frame 400 this may result in outputting both the idling attribute, a ready attribute identifying the object as standing or being ready/able to enter a roadway (e.g., pedestrian is standing, pedestrian is in a wheelchair and is capable of movement at any moment), and/or the object is looking at the vehicle. In some instances, all three of the latter examples may be output in an example where the output heads include at least three groups one group for roadway-entering intent, another group for readiness to enter the roadway and/or object state (e.g., standing, sitting, walking, running, other (catch-all for dancing, aberrant behavior, etc.)), and/or a third group for whether the object sees, is looking at, or paying attention to the vehicle. Additional groups may be directed at whether another object anticipates the vehicle proceeding or is indicating that the vehicle should proceed, such as waving the vehicle on, looking at the vehicle and not moving, indicating with a sign that the vehicle should stop or go, etc. More or less groups may be used in practice.

For the second frame 402, the highest confidence score output by the ML architecture 300 may be associated with an intent-to-enter attribute that indicates that an object is exhibiting an intent to enter the roadway. To classify the second frame 402 as such, the ML architecture 300 may receive and process frames 418, indicated using diagonal hatching, as input, as discussed above.

For the third frame 404, the highest confidence score output by the ML architecture 300 may be associated with an actively entering/crossing the roadway that indicates that an object is entering/has entered the roadway. Additional attributes that may be output by the ML architecture 300 may indicate that the object is not looking at the vehicle, is walking, etc. To classify the second frame 402 as such, the ML architecture 300 may receive and process frames 420, indicated using diagonal hatching, as input, as discussed above.

Example Process(es)

Figure 5:
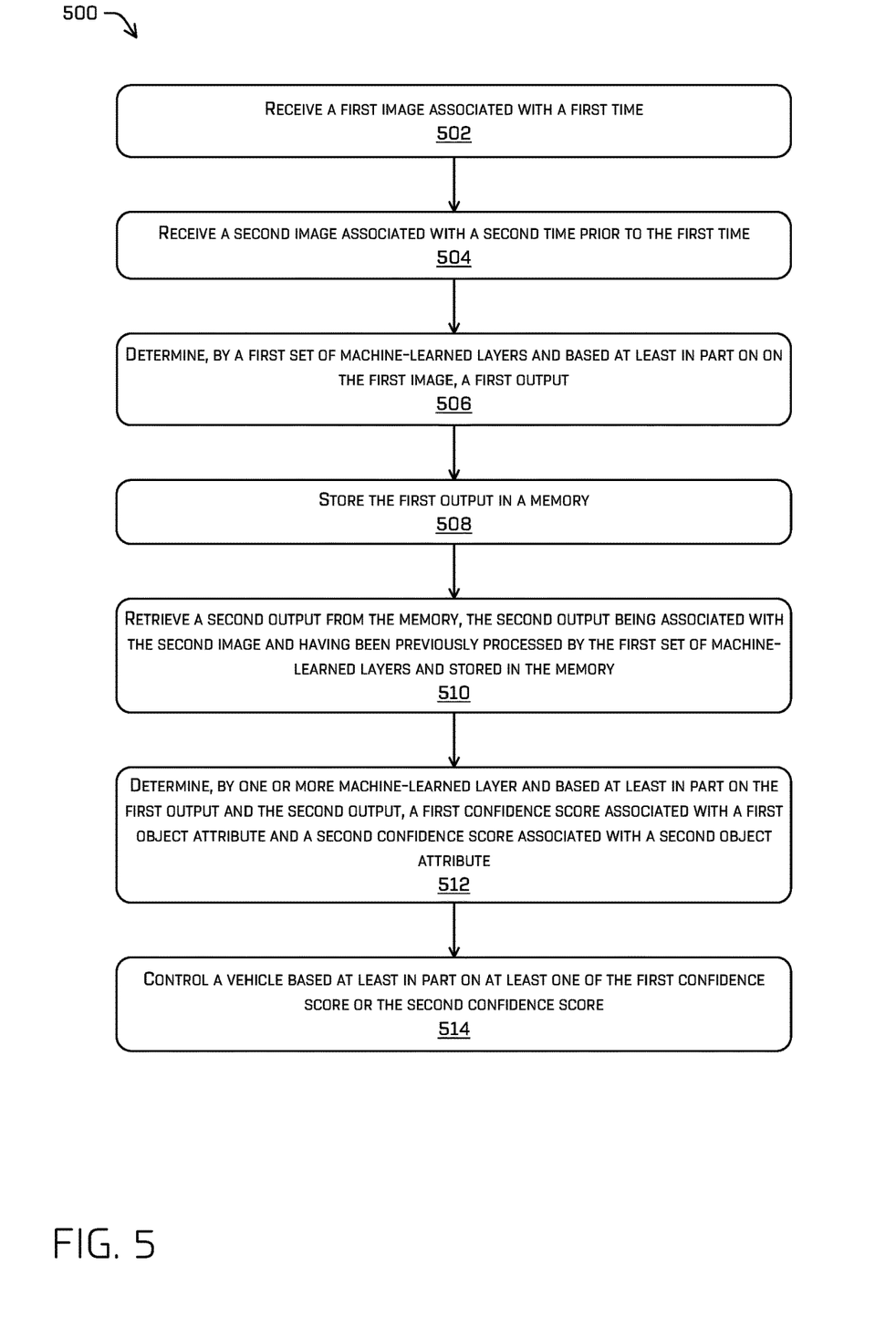
FIG. 5 illustrates a flow diagram of an example process for detecting object attributes and/or intentions and reducing the computational bandwidth for doing so.

FIG. 5 illustrates a flow diagram of an example process 500 for detecting object attributes and/or intentions and reducing the computational bandwidth for doing so. In some examples, example process 500 may be accomplished by vehicle the machine-learned architecture 300. Although the techniques discussed herein discuss images, it is understood that the techniques may be appropriated to other types of sensor data.

At operation 502, example process 500 may comprise receiving a first image associated with a first time. The first image may be a most-recently received image associated with an object identified by a track. The first image may be the n-th image 306 in FIG. 3. If the object has been recently detected, the ML component 300 may wait to accumulate n images before starting to operate. In an additional or alternate example, the ML component 300 may process images as they come in but may not determine an output until n images have been processed.

At operation 504, example process 500 may comprise receiving a second image associated with a second time prior to the first time. The second image and the first image may both be associated with a same object and may be portions of a larger image. For example, the first image may be a first portion of a first image identified by a first ROI output by an upstream ML model and the second image may be a second portion of a second image identified by a second ROI output by the upstream ML model. The two images may be associated by a track output by yet another ML model, see U.S. patent application Ser. No. 16/235,862, filed Dec. 28, 2018.

At operation 506, example process 500 may comprise determining, by a first set of ML layers and based at least in part on the first image, a first output. The first set of ML layers may include the layers of the ML backbone 308. The ML backbone 308 may run once per image. In other words, the ML backbone 308 processes the most-recently received image, but doesn't run again for the previously received images, whereas other ML layers of the ML architecture 300 may process output(s) of the ML backbone 308 as discussed below.

At operation 508, example process 500 may comprise storing the first output in a memory (e.g., a cache). A second output determined by the first set of ML layers based at least in part on the second image may have previously been stored in the memory, e.g., when the second image was received and was the most current image.

At operation 510, example process 500 may comprise retrieving a second output from the memory, the second output being associated with the second image and having been previously processed by the first set of ML layers and stored in the memory.

At operation 512, example process 500 may comprise determining, by one or more ML layer(s) and based at least in part on the first output and the second output, a first confidence score associated with a first object attribute (e.g., pedestrian, animal, cyclist, driver, machinery operator) and a second confidence score associated with a pedestrian attribute. For example, the first object attribute may include an indication of a readiness of an object to enter the roadway or a general state of the object (e.g., standing, sitting, ready to enter roadway, not ready to enter roadway, walking, running, other), an object indicator state (e.g., indicator not existent, pedestrian holding sign, pedestrian holding sign up, pedestrian indicating go, pedestrian indicating no-go, cyclist indicating left turn, cyclist indicator right turn, cyclist indicating braking, vehicle lights indicating turn, vehicle lights indicating braking, traffic lights indicating go, traffic lights indicating stop, traffic lights indicating caution), the object is exhibiting an intent to enter the roadway, the object is entering/has entered the roadway, object attentiveness (e.g., sees/doesn't see the vehicle, paying attention to the vehicle/inattentive) and the second object attribute may indicate a different one of the attributes. The confidence score may indicate a likelihood (e.g., a posterior probability) that the object attribute accurately describes the object.

At operation 514, example process 500 may comprise controlling a vehicle based at least in part on at least one of the first confidence score or the second confidence score. Operation 514 may include determining which confidence score is greater and using that confidence score and/or determining whether the confidence score meets or exceeds a confidence score threshold. The confidence score threshold may be used to determine whether to output an attribute at all. For example, if no confidence scores meet the confidence score threshold no attribute may be output; although, in an additional or alternate example, the attribute associated with the maximum confidence score may be output anyway. In any case, the confidence score may be output in association with the attribute. The planning component of the vehicle may use the attribute (and confidence score, in examples where the confidence score is also output) to determine a trajectory for controlling the vehicle.

Example Clauses

A: A method comprising: receiving a first image associated with a first time; receiving a second image associated with a second time prior to the first time, wherein the first image and the second image are associated with a same object; determining, by a first set of machine-learned layers and based at least in part on the first image, a first output; storing the first output in a memory; retrieving a second output from the memory, the second output being associated with the second image and having been previously processed by the first set of machine-learned layers and stored in the memory; determining, by one or more machine-learned layers and based at least in part on the first output and the second output, a first confidence score associated with a first pedestrian attribute and a second confidence score associated with a second pedestrian attribute; and controlling a vehicle based at least in part on at least one of the first confidence score or the second confidence score.

B: The method of paragraph A, wherein: the first pedestrian attribute indicates one of: a pedestrian is idling, the pedestrian intends to enter a roadway, or the pedestrian is crossing a roadway; and the second pedestrian attribute indicates a different one of: the pedestrian is idling, the pedestrian intends to enter a roadway, or the pedestrian is crossing a roadway.

C: The method of either paragraph A or B, wherein the one or more machine-learned layers comprise a second machine-learned layer, a third machine-learned layer, and a fourth machine learned layer; and determining the first confidence score associated with the first pedestrian attribute and the second confidence score associated with the second pedestrian attribute comprises: determining, by the second machine-learned layer and based at least in part on the first output, a third output; determining, by the second machine-learned layer and based at least in part on the second output, a fourth output; concatenating, as a concatenated output, the third output and the fourth output; providing the concatenated output as an input to the third machine-learned layer; receiving a fifth output from the third machine-learned layer; providing the fifth output to the fourth machine-learned layer as input; and receiving the third confidence score and the fourth confidence score from the fourth machine-learned layer.

D: The method of paragraph C, wherein the first set of machine-learned layers comprises multiple layers of a neural network and the second machine-learned layer, third machine-learned layer, and the fourth machine-learned layer comprise different fully-connected layers.

E: The method of any one of paragraphs A-D, wherein: the first image is a first portion of a first larger image; the second image is a second portion of a second larger image; and the first portion and the second portion are generated by a first machine-learned component based at least in part on the first larger image and the second larger image.

F: A system comprising: one or more processors; and a memory storing processor-executable instructions that, when executed by the one or more processors, cause the system to perform operations comprising: receiving a first image associated with a first time; receiving a second image associated with a second time prior to the first time; determining, by a first set of machine-learned layers and based at least in part on the first image, a first output; storing the first output in a memory; retrieving a second output from the memory, the second output being associated with the second image; determining, by one or more machine-learned layers and based at least in part on the first output and the second output, an attribute associated with an object in an environment; and controlling a vehicle based at least in part on the attribute.

G: The system of paragraph F, wherein the attribute associated with the object comprises: an indication of a vehicle motion state; an indication of an object indicator state; an indication that the object is idling; an indication that the object intends to enter a roadway; or an indication that the object is crossing the roadway.

H: The system of either paragraph F or G, wherein the memory is a cache and the cache stores n number of outputs of the first set of machine-learned layers, wherein n is a positive integer associated with n previous time steps.

I: The system of any one of paragraphs F-H, wherein the first output and the second output are each processed by the first set of machine-learned layers once.

J: The system of any one of paragraphs F-I, wherein the attribute indicates that a pedestrian is idling near a roadway, the pedestrian intends to enter the roadway, the pedestrian is crossing the roadway, the pedestrian is ready to enter the roadway, or the pedestrian is not related to the roadway.

K: The system of any one of paragraphs F-J, wherein the one or more machine-learned layers comprise a second machine-learned layer, a third machine-learned layer, and a fourth machine-learned layer; and determining the attribute comprises: determining, by the second machine-learned layer and based at least in part on the first output, a third output; determining, by the second machine-learned layer and based at least in part on the second output, a fourth output; concatenating, as a concatenated output, the third output and the fourth output; providing the concatenated output as an input to the third machine-learned layer; receiving a fifth output from the third machine-learned layer; providing the fifth output to the fourth machine-learned layer as input; and receiving a confidence score associated with the attribute from the fourth machine-learned layer.

L: The system of paragraph K, wherein the first set of machine-learned layers comprises multiple layers of a neural network and the second machine-learned layer, third machine-learned layer, and the fourth machine-learned layer comprise different fully-connected layers.

M: The system of any one of paragraphs F-L, wherein: the first image is a first portion of a first larger image; the second image is a second portion of a second larger image; and the first portion and the second portion are generated by a first machine-learned component based at least in part on the first larger image and the second larger image.

N: One or more non-transitory computer-readable media storing processor-executable instructions that, when executed by one or more processors, cause the one or more processors to perform operations comprising: receiving a first image associated with a first time; receiving a second image associated with a second time prior to the first time; determining, by a first set of machine-learned layers and based at least in part on the first image, a first output; storing the first output in a memory; retrieving a second output from the memory, the second output being associated with the second image; determining, by one or more machine-learned layers and based at least in part on the first output and the second output, an attribute associated with an object in an environment; and controlling a vehicle based at least in part on the attribute.

O: The one or more non-transitory computer-readable media of paragraph N, wherein the attribute associated with the object comprises: an indication of a vehicle motion state; an indication of an object indicator state; an indication that the object is idling; an indication that the object intends to enter a roadway; or an indication that the object is crossing the roadway.

P: The one or more non-transitory computer-readable media of either paragraph N or O, wherein the memory is a cache and the cache stores n number of outputs of the first set of machine-learned layers, wherein n is a positive integer associated with n previous time steps.

Q: The one or more non-transitory computer-readable media of any one of paragraphs N-P, wherein the first output and the second output are each processed by the first set of machine-learned layers once.

R: The one or more non-transitory computer-readable media of any one of paragraphs N-Q, wherein the attribute indicates that a pedestrian is idling near a roadway, the pedestrian intends to enter the roadway, the pedestrian is crossing the roadway, the pedestrian is ready to enter the roadway, or the pedestrian is not related to the roadway.

S: The one or more non-transitory computer-readable media of any one of paragraphs N-R, wherein the one or more machine-learned layers comprise a second machine-learned layer, a third machine-learned layer, and a fourth machine-learned layer; and determining the attribute comprises: determining, by the second machine-learned layer and based at least in part on the first output, a third output; determining, by the second machine-learned layer and based at least in part on the second output, a fourth output; concatenating, as a concatenated output, the third output and the fourth output; providing the concatenated output as an input to the third machine-learned layer; receiving a fifth output from the third machine-learned layer; providing the fifth output to the fourth machine-learned layer as input; and receiving a confidence score associated with the attribute from the fourth machine-learned layer.

T: The one or more non-transitory computer-readable media of any one of paragraphs N-S, wherein the first set of machine-learned layers comprises multiple layers of a neural network and the second machine-learned layer, third machine-learned layer, and the fourth machine-learned layer comprise different fully-connected layers.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving first sensor data associated with an object;
receiving second sensor data associated with the object;
determining, by a first machine-learned model and based at least in part on the first sensor data, a first output;
storing the first output in a cache;
retrieving, from the cache a second output previously generated by the first machine-learned model and based at least in part on the second sensor data;
aggregating, as an aggregated output, the first output and the second output;
determining, by a second machine-learned model and based at least in part on the aggregated output, an attribute associated with the object in an environment, the attribute indicating at least one of a motion of the object, a state of the object, a predicted intent of the object, or an association of the object with another object; and
controlling a vehicle based at least in part on the attribute.

2. The method of claim 1, wherein the attribute indicates at least one of:
an indication of an object motion state,
an indication of an object indicator state,
an indication that the object is idling,
an indication that the object intends to enter a roadway, or
an indication that the object is not associated with the roadway.

3. The method of claim 1, wherein the first machine-learned model comprises an object detection machine-learned model and a set of machine-learned layers that receives outputs from the object detection machine-learned model.

4. The method of claim 3, wherein aggregating the first output and the second output comprises:
determining, by the object detection machine-learned model and based at least in part on the first sensor data, a first intermediate output;
determining, by the object detection machine-learned model and based at least in part on the second sensor data, a second intermediate output;
determining, based at least in part on a first machine-learned layer of the set of machine-learned layers and the first intermediate output, a third intermediate output;

determining, based at least in part on a second machine-learned layer of the set of machine-learned layers and the second intermediate output, a fourth intermediate output; and determining the aggregated output by a third machine-learned layer.

5. The method of claim 1, wherein:
the first sensor data is a first subset of a first set of sensor data;
the second sensor data is a second subset of a second set of sensor data; and
the first subset and the second subset are determined by a pre-processing machine-learned component based at least in part on the first set of sensor data and the second set of sensor data.

6. The method of claim 1, wherein the cache stores n number of outputs of the first machine-learned model, wherein n is a positive integer associated with n previous time steps.

7. A system comprising:
one or more processors; and
a memory storing processor-executable instructions that, when executed by the one or more processors, cause the system to perform operations comprising:
receiving first sensor data associated with an object;
receiving second sensor data associated with the object;
determining, by a first machine-learned model and based at least in part on the first sensor data, a first output, wherein the first machine-learned model comprises an object detection machine-learned model and a set of machine-learned layers that receives outputs from the object detection machine-learned model;
determining, by the first machine-learned model and based at least in part on the second sensor data, a second output;
aggregating, as an aggregated output, the first output and the second output;
determining, by a second machine-learned model and based at least in part on the aggregated output, an attribute associated with the object in an environment, wherein the attribute indicates at least one of:
an indication of an object motion state,
an indication of an object indicator state,
an indication that the object is idling,
an indication that the object intends to enter a roadway, or
an indication that the object is not associated with the roadway; and
controlling a vehicle based at least in part on the attribute.

8. The system of claim 7, wherein aggregating the first output and the second output comprises:
determining, by the object detection machine-learned model and based at least in part on the first sensor data, a first intermediate output;
determining, by the object detection machine-learned model and based at least in part on the second sensor data, a second intermediate output;
determining, based at least in part on a first machine-learned layer of the set of machine-learned layers and the first intermediate output, a third intermediate output;
determining, based at least in part on a second machine-learned layer of the set of machine-learned layers and the second intermediate output, a fourth intermediate output; and determining the aggregated output by a third machine-learned layer.

9. The system of claim 7, wherein:
the first sensor data is a first subset of a first set of sensor data;
the second sensor data is a second subset of a second set of sensor data; and
the first subset and the second subset are determined by a pre-processing machine-learned component based at least in part on the first set of sensor data and the second set of sensor data.

10. The system of claim 7, wherein the operations further comprise retrieving the second output from a memory, wherein the memory is a cache and the cache stores n number of outputs of the first machine-learned model, wherein n is a positive integer associated with n previous time steps.

11. The system of claim 7, wherein the second sensor data is received before the first sensor data and the second output is determined before the first output.

12. One or more non-transitory computer-readable media storing processor-executable instructions that, when executed by one or more processors, cause the one or more processors to perform operations comprising:
receiving first sensor data associated with an object;
receiving second sensor data associated with the object;
determining, by a first machine-learned model and based at least in part on the first sensor data, a first output;
determining a second output by retrieving the second output from a memory, wherein the memory is a cache and the cache stores n number of outputs of the first machine-learned model, wherein n is a positive integer associated with n previous time steps;
aggregating, as an aggregated output, the first output and the second output;
determining, by a second machine-learned model and based at least in part on the aggregated output, an attribute associated with the object in an environment, wherein the attribute indicates at least one of:
an indication of an object motion state,
an indication of an object indicator state,
an indication that the object is idling,
an indication that the object intends to enter a roadway, or
an indication that the object is not associated with the roadway; and
controlling a vehicle based at least in part on the attribute.

13. The one or more non-transitory computer-readable media of claim 12, wherein the first machine-learned model comprises an object detection machine-learned model and a set of machine-learned layers that receives outputs from the object detection machine-learned model.

14. The one or more non-transitory computer-readable media of claim 13, wherein aggregating the first output and the second output comprises:
determining, by the object detection machine-learned model and based at least in part on the first sensor data, a first intermediate output;
determining, by the object detection machine-learned model and based at least in part on the second sensor data, a second intermediate output;
determining, based at least in part on a first machine-learned layer of the set of machine-learned layers and the first intermediate output, a third intermediate output;

determining, based at least in part on a second machine-learned layer of the set of machine-learned layers and the second intermediate output, a fourth intermediate output; and determining the aggregated output by a third machine-learned layer.

15. The one or more non-transitory computer-readable media of claim 14, wherein:

the first sensor data is a first subset of a first set of sensor data;

the second sensor data is a second subset of a second set of sensor data; and the first subset and the second subset are determined by a pre-processing machine-learned component based at least in part on the first set of sensor data and the second set of sensor data.

16. The one or more non-transitory computer-readable media of claim 12, wherein the second sensor data is received before the first sensor data.

17. The method of claim 1, further comprising:

determining a confidence level associated with the attribute; and outputting the attribute based on the confidence level at least one of:

meeting or exceeding a confidence threshold; or being greater than other confidence scores associated with other attributes determined by the second machine-learned model.

18. The method of claim 1, wherein the attribute comprises multiple attributes, and the method further comprises:

determining confidence levels associated with individual attributes of the multiple attributes;

outputting a subset of the multiple attributes based at least in part on the confidence levels; and wherein controlling the vehicle is based at least in part on the subset.

19. The system of claim 7, the operations further comprising:

determining a confidence level associated with the attribute; and outputting the attribute based on the confidence level at least one of:

meeting or exceeding a confidence threshold; or being greater than other confidence scores associated with other attributes determined by the second machine-learned model.

20. The one or more non-transitory computer-readable media of claim 12, further comprising:

determining a confidence level associated with the attribute; and outputting the attribute based on the confidence level at least one of:

meeting or exceeding a confidence threshold; or being greater than other confidence scores associated with other attributes determined by the second machine-learned model.

* * * * *